(12) United States Patent
Yoon

(10) Patent No.: US 12,208,818 B2
(45) Date of Patent: Jan. 28, 2025

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventor: Dae Joong Yoon, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 246 days.

(21) Appl. No.: 18/081,068

(22) Filed: Dec. 14, 2022

(65) Prior Publication Data

US 2023/0219598 A1    Jul. 13, 2023

(30) Foreign Application Priority Data

Jan. 13, 2022   (KR) ..................... 10-2022-0005197

(51) Int. Cl.
```
B60W 60/00      (2020.01)
B60K 35/00      (2006.01)
B60R 11/04      (2006.01)
B60W 30/06      (2006.01)
G01C 21/36      (2006.01)
B60K 35/22      (2024.01)
B60K 35/28      (2024.01)
B60K 35/81      (2024.01)
```

(52) U.S. Cl.
CPC ........... B60W 60/001 (2020.02); B60K 35/00 (2013.01); B60R 11/04 (2013.01); B60W 30/06 (2013.01); G01C 21/3661 (2013.01); G01C 21/3685 (2013.01); B60K 35/22 (2024.01); B60K 35/28 (2024.01); B60K 35/81 (2024.01); *B60K 2360/166* (2024.01); *B60K 2360/179* (2024.01); *B60W 2556/40* (2020.02)

(58) Field of Classification Search
CPC .............. B60W 60/001; B60W 30/06; B60W 2556/40; B60K 35/00; B60K 35/22; B60K 35/28; B60K 35/81; B60K 2360/166; B60K 2360/179; B60R 11/04; G01C 21/3661; G01C 21/3685
USPC .......................................................... 701/25
See application file for complete search history.

(56) References Cited

U.S. PATENT DOCUMENTS

| | | | |
|---|---|---|---|
| 2015/0217763 A1* | 8/2015 | Reichel | B60W 60/0061 701/23 |
| 2021/0354686 A1* | 11/2021 | Pan | G01S 15/08 |
| 2021/0409379 A1* | 12/2021 | Hwang | G08G 1/0112 |

* cited by examiner

*Primary Examiner* — Isaac G Smith
(74) *Attorney, Agent, or Firm* — Morgan, Lewis & Bockius LLP

(57) ABSTRACT

A vehicle for performing an autonomous parking function, the vehicle including: at least one camera configured to acquire a surrounding image of a vehicle; a display; a storage configured to store a HD map of a parking lot including an autonomous parking preparation zone; and at least one process configured to, based on the surrounding image of the vehicle being processed, generate a surround view image, based on an upper end of a road mark defining the autonomous parking preparation zone being recognized in the surround view image, track a position of the upper end of the road mark, upon the vehicle being stopped while a part of the road mark is recognized, correct a starting point on the HD map of the parking lot based on the position of the upper end of the road mark, and upon a user input for performing an autonomous parking function being received, perform the autonomous parking function based on the correct starting point.

20 Claims, 11 Drawing Sheets

VEHICLE AND METHOD OF CONTROLLING THE SAME

CROSS-REFERENCE TO RELATED APPLICATION

This application is based on and claims priority under 35 U.S.C. § 119 to Korean Patent Application No. 10-2022-0005197, filed on Jan. 13, 2022 in the Korean Intellectual Property Office, the disclosure of which is incorporated herein by reference.

TECHNICAL FIELD

The present disclosure relates to a vehicle and a method of controlling the same, and more specifically, to a vehicle for performing an autonomous parking function and a method of controlling the same.

BACKGROUND

As autonomous travelling technology is developing, a technology for autonomously parking a vehicle without a driver's manual operation has been developing.

For example, a parking lot supporting an autonomous parking function may allow a vehicle stopped in a predetermined area to be automatically parked in a parking space using expensive infrastructure, such as a control camera, a communication system, a Lidar, and the like.

Specifically, a driver may stop and get off the vehicle in a predetermined area and remotely transmit a parking command through a terminal device, and a parking control system of the parking lot may calculate a travel route for parking the vehicle stopped in the predetermined area in an empty parking space and remotely control the vehicle to park the vehicle.

SUMMARY

The present disclosure may provide a vehicle capable of performing an autonomous parking function in a parking lot without expensive infrastructure, and a method of controlling the same.

The technical objectives of the disclosure are not limited to the above, and other objectives may become apparent to those of ordinary skill in the art based on the following descriptions.

According to an aspect of the disclosure, there is provided a vehicle including: at least one camera configured to acquire a surrounding image of a vehicle; a display; a storage configured to store a high definition map (HD map) of a parking lot including an autonomous parking preparation zone; and at least one process configured to, generate a surround view image based on processing the surrounding image of the vehicle, and based on an upper end of a road mark defining the autonomous parking preparation zone being recognized in the surround view image, track a position of the upper end of the road mark, and upon the vehicle being stopped while a part of the road mark is being recognized, correct a starting point on the HD map of the parking lot based on the position of the upper end of the road mark, and in response to a user input for performing an autonomous parking function being received, perform the autonomous parking function based on the correct starting point.

The at least one processor may be configured to calculate a positional relationship between the vehicle and the autonomous parking preparation zone based on the position of the upper end of the road mark to correct the starting point on the HD map of the parking lot based on the calculated positional relationship.

The at least one processor may be configured to, based on the vehicle having arrived at the parking lot, control the display to output a visual representation for guiding the vehicle to the autonomous parking preparation zone.

The at least one processor may be configured to, based on the vehicle having arrived at the parking lot, control the display to display a surround view image with a reduced magnification.

The at least one processor may be configured to, upon a lower end of the road mark being recognized in the surround view image, control the display to output a visual representation for guiding the vehicle into the autonomous parking preparation zone based on a positional relationship between the vehicle and the lower end of the road mark.

The visual representation for guiding the vehicle into the autonomous parking preparation zone may include at least one of: a first visual representation indicating a distance between a rear side of the vehicle and the lower end of the road mark, a second visual representation indicating a required acceleration corresponding to the distance and a speed of the vehicle, or a third visual representation indicating a required steering direction for matching a center of the vehicle and a center of the lower end of the road mark.

The at least one processor may be configured to, based on the upper end of the road mark being recognized in the surround view image, control the display to display the surround view image with an enlarged magnification.

The at least one processor may be configured to, upon the upper end of the road mark being recognized in the surround view image, control the display to output a visual representation for guiding the vehicle into the autonomous parking preparation zone based on a positional relationship between the vehicle and the upper end of the road mark.

The visual representation for guiding the vehicle into the autonomous parking preparation zone may include at least one of: a first visual representation indicating a distance between a front side of the vehicle and the upper end of the road mark; a second visual representation indicating a required acceleration corresponding to the distance and a speed of the vehicle; or a third visual representation indicating a required steering direction for matching a center of the vehicle and a center of the upper end of the road mark.

The vehicle may further include a communicator configured to receive parking space information of the parking lot from a server.

According to another aspect of the disclosure, there is provided a method of controlling a vehicle in which a HD map of a parking lot including an autonomous parking preparation zone is stored, the method including; generating a surround view image based on processing a surrounding image of the vehicle; based on an upper end of a road mark defining the autonomous parking preparation zone being recognized in the surround view image, tracking a position of the upper end of the road mark; upon the vehicle being stopped while a part of the road mark is being recognized, correcting a starting point on the HD map of the parking lot based on the position of the upper end of the road mark; and upon a user input for performing an autonomous parking function being received, performing the autonomous parking function.

The correcting of the starting point on the HD map of the parking lot may include calculating a positional relationship between the vehicle and the autonomous parking preparation zone based on the position of the upper end of the road mark, and correcting the starting point on the HD map of the parking lot based on the calculated positional relationship.

The method may further include, based on the vehicle having arrived at the parking lot, outputting a visual representation for guiding the vehicle to the autonomous parking preparation zone.

The method may further include, based on the vehicle having arrived at the parking lot, displaying a surround view image with a reduced magnification.

The method may further include, upon a lower end of the road mark being recognized in the surround view image, outputting a visual representation for guiding the vehicle into the autonomous parking preparation zone based on a positional relationship between the vehicle and the lower end of the road mark.

The visual representation for guiding the vehicle into the autonomous parking preparation zone may include one of a first visual representation indicating a distance between a rear side of the vehicle and the lower end of the road mark, a second visual representation indicating a required acceleration corresponding to the distance and a speed of the vehicle, a third visual representation indicating a required steering direction for matching a center of the vehicle and a center of the lower end of the road mark, and a combination thereof.

The method may further include, based on the upper end of the road mark being recognized in the surround view image, displaying the surround view image with an enlarged magnification.

The method may further include, upon the upper end of the road mark being recognized in the surround view image, outputting a visual representation for guiding the vehicle into the autonomous parking preparation zone based on a positional relationship between the vehicle and the upper end of the road mark.

The visual representation for guiding the vehicle into the autonomous parking preparation zone may include one of: a first visual representation indicating a distance between a front side of the vehicle and the upper end of the road mark, a second visual representation indicating a required acceleration corresponding to the distance and a speed of the vehicle, a third visual representation indicating a required steering direction for matching a center of the vehicle and a center of the upper end of the road mark, and a combination thereof.

The method may further include receiving parking space information of the parking lot from a server.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
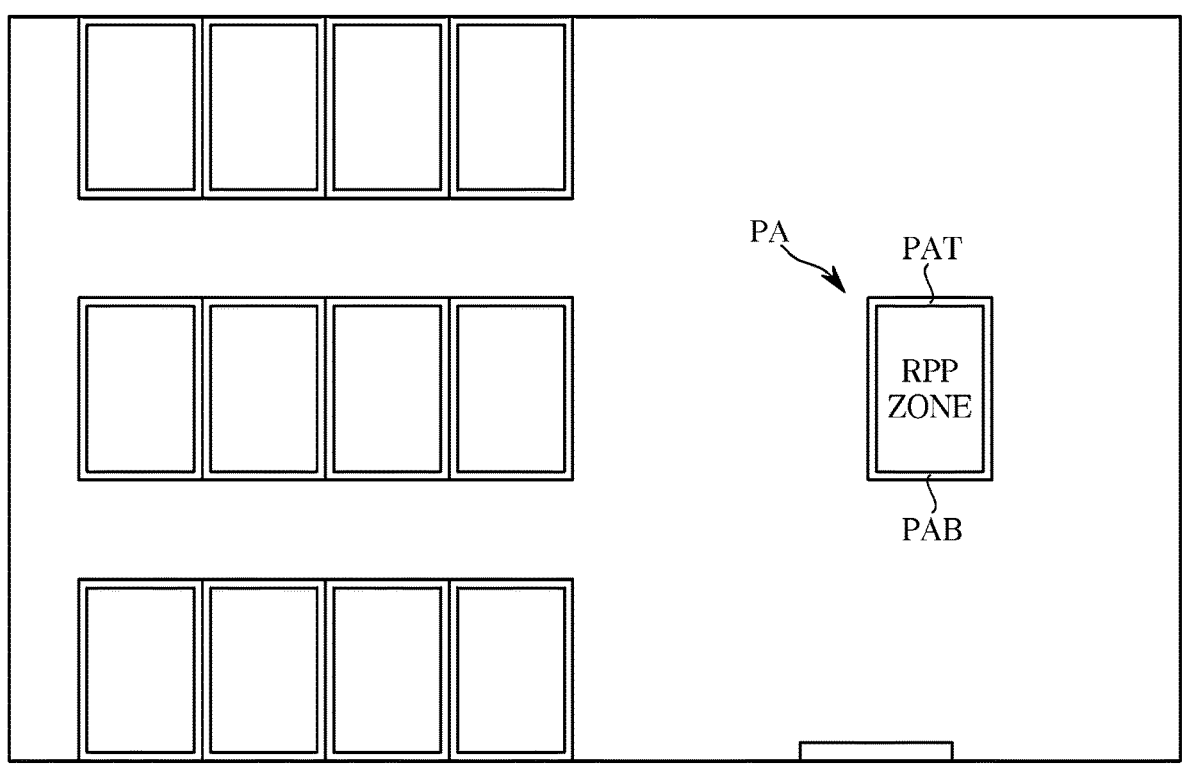
FIG. 1 is a plan view illustrating a parking lot allowing an autonomous parking function.

Advantages and features of disclosure and methods and apparatus of achieving the same will be clearly understood with reference to the accompanying drawings and the following detailed embodiments. However, the present inventive concept is not limited to embodiments described herein, but may be implemented in various different forms. Embodiments are provided in order to explain the present inventive concept for those skilled in the art. The scope of the present inventive concept is defined by the appended claims.

The terms used herein will be briefly described and disclosure embodiments will be described in detail.

Although the terms used herein are selected from among general terms that are currently and widely used in consideration of functions in disclosure embodiments, these may be changed according to intentions or customs of those skilled in the art or the advent of new technology. In addition, in a specific case, some terms may be arbitrary selected by applicants. In this case, meanings thereof will be described in a corresponding description of disclosure embodiments. Therefore, the meanings of terms used herein should be interpreted based on substantial meanings of the terms and content of this entire specification, rather than simply the terms themselves.

Throughout this specification, when a certain part "includes" a certain component, it means that another component may be further included not excluding another component unless otherwise defined. Moreover, terms described in the specification such as "part," "module," and "unit," refer to a unit of processing at least one function or operation, and may be implemented by software, a hardware component such as a field-programmable gate array (FPGA) or an application-specific integrated circuit (ASIC), or a combination of software and hardware. However, the terms "part," "module," "unit," and the like are not limited to software or hardware. "Part," "module," "unit," and the like may be configured in a recording medium that may be addressed or may be configured to be reproduced on at least one processor. Therefore, examples of the terms "part," "module," "unit," and the like include software components, object-oriented software components, components such as class components and task components, processes, functions, properties, procedures, subroutines, segments in program codes, drivers, firmware, microcode, circuits, data, databases, data structures, tables, arrays, and variables. The components and the modules may be provided into smaller number of components and modules such that the respective component and modules may be merged in respect to the functionality.

Hereinafter, embodiments of a vehicle and a method of controlling the same will be described in detail with reference to the accompanying drawings. In addition, parts irrelevant to description are omitted in the drawings in order to clearly explain disclosure embodiments.

FIG. 1 is a plan view illustrating a parking lot allowing an autonomous parking function.

Referring to FIG. 1, a parking lot supporting an autonomous parking function may include an autonomous parking preparation zone (a remote parking pilot zone: RPP zone) defining an initial position for starting the autonomous parking function.

In an embodiment, a road mark PA for defining an RPP zone may be provided on a road surface of a parking lot. Specifically, the inner area surrounded by the road mark PA may be defined as an RPP zone.

The road mark PA may be implemented in various forms according to the overall length and width of general vehicles and/or the road width of parking lots. As an example, the road mark PA may be implemented in a rectangular shape.

The road mark PA may include an upper end PAT, a lower end PAB, and a side end connecting the upper end PAT and the lower end PAB. When the road mark PA is implemented in a rectangular shape, the upper end PAT of the road mark PA may refer to the upper side of the rectangle, and the lower end PAB of the road mark PA may refer to the lower side of the rectangle, and the side end of the road mark PA may refer to the left side and the right side of the rectangle.

The upper end PAT and the lower end PAB of the road mark PA may be determined according to a preset travelling direction in the parking lot.

For example, when an RPP zone is provided on a road in which the vehicle travels in the first direction, the upper end PAT of the road mark PA may be defined as a side positioned in the first direction, and the lower end PAB of the road mark PA may be defined a side positioned in a direction opposite to the first direction.

However, the upper end PAT and the lower end PAB of the road mark PA are not collectively defined according to the preset travelling direction in the parking lot.

For example, the road mark PA may not have the upper end PAT and the lower end PAB defined separately, and when the upper end PAT and the lower end PAB are not defined in the road mark PA, a side positioned in front of the vehicle 10 stopped inside the RPP zone may be defined as the upper end PAT and a side positioned behind the vehicle 10 may be defined as the lower end PAB.

In consideration of the overall width and length of the vehicle 10, the lengths of the lower end PAB and the upper end PAT of the road mark PA may be shorter than the lengths of the side ends of the road mark PA.

In this specification, a parking lot supporting an autonomous parking function may refer to a parking lot in which a high definition map (HD map) is built.

The HD map may refer to a precise electronic map that includes all information required for autonomous travelling of an autonomous vehicle. The all information required for autonomous travelling may include, for example, various information, such as a road section, an accessory section, a travelling route link, a height obstacle, a road surface line, a sign, a parking space, etc. of a parking lot.

The HD map of the parking lot may be implemented in a three-dimensional form by electronically processing spatial information of the parking lot, or may be implemented in a standardized manner to be processed by an autonomous driving device 130.

HD map information of a parking lot supporting an autonomous parking function may be stored in advance in an external server and/or the vehicle 10.

A driver who desires to use an autonomous parking function needs to stop the vehicle 10 in an RPP zone and then input a command to execute the autonomous parking function through an interface of the vehicle 10 and/or an interface of a user terminal.

The vehicle 10 may recognize the RPP zone on the HD map of the parking lot as a starting point, calculate a route between the starting point and a target parking zone, and perform autonomous driving according to the calculated route, thereby parking the vehicle 10.

Figure 2:
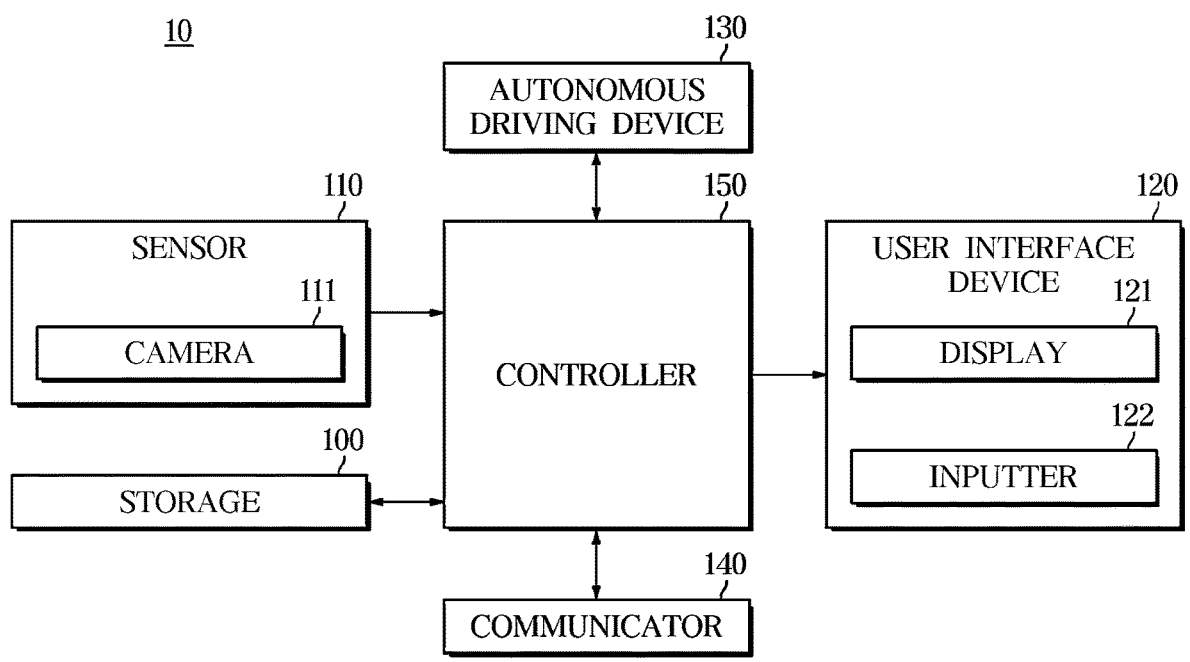
FIG. 2 is a block diagram illustrating a configuration of a vehicle according to an embodiment.

FIG. 2 is a block diagram illustrating a configuration of a vehicle according to an embodiment.

Referring to FIG. 2, a vehicle 10 according to an embodiment includes a storage 100, a sensor 110, a user interface device 120, an autonomous driving device 130, a communicator 140, and a controller 150.

The storage 100 may store a HD map of a parking lot including an RPP zone.

For example, the storage 100 may store a HD map of a parking lot in advance in the manufacturing stage of the vehicle 10, or store a HD map received from the external server through the communicator 140.

The HD map of the parking lot stored in the storage 100 may be kept updated according to update information.

The storage 100 may include at least one memory for storing a HD map of a parking lot.

The sensor 110 may include at least one sensor for detecting a surrounding environment of the vehicle 10.

For example, the sensor 110 may include at least one camera 111 for acquiring a surrounding image of the vehicle 10.

The at least one camera 111 may include a front camera that has a front imaging area of the vehicle 10 and acquires a front image, a rear camera that has a rear imaging area of the vehicle 10 and acquires a rear image of the vehicle 10, a left camera that has a left side imaging area of the vehicle 10 and acquires a left side image of the vehicle 10, and/or a right camera that has a right side imaging area of the vehicle 10 and acquires a right side image of the vehicle 10, The front camera may be provided at an appropriate position to have a front imaging area, for example, the front camera may be provided inside the vehicle 10 and/or outside the vehicle 10 (e.g., a grille or a front bumper).

The rear camera may be provided at an appropriate position to have a rear imaging area, for example, the rear camera may be provided inside the vehicle 10 and/or outside the vehicle 10 (e.g., a trunk or rear bumper).

The left camera and the right camera may also be provided at appropriate positions to have the left and right imaging areas, respectively. For example, the left camera may be provided in the left side mirror and the right camera may be provided in the right side mirror.

However, the position of the at least one camera 111 is not limited to the above-described example.

The at least one camera 111 may employ a complementary metal-oxide semiconductor (CMOS) image sensor or a charge-coupled device (CCD) image sensor.

The at least one camera 111 may be provided as a camera used in a surround view monitor (SVM) system of the vehicle 10, but is not limited thereto.

Although not shown in the drawings, the sensor 110 may include various types of sensors for acquiring various types of information required to perform autonomous driving.

For example, the sensor 110 may include at least one ultrasonic sensor having a sensing area facing the outside of the vehicle 10, and the at least one ultrasonic sensor may detect an object adjacent to the vehicle 10 by transmitting and receiving ultrasonic waves.

The at least one ultrasonic sensor may be provided in plural to detect objects in a front, a side and front, a rear, and a side and rear of the vehicle 10.

The at least one ultrasonic sensor may be provided as an ultrasonic sensor used in a parking assistance system (PAS) of the vehicle 10, but is not limited thereto.

In addition, the sensor 110 may include a plurality of radar sensors for acquiring radar data around the vehicle 10 and/or a Lidar sensor for acquiring point cloud data around the vehicle 10.

In addition, the sensor 110 may include various sensors (e.g., a GPS sensor, a vehicle speed sensor, a steering angle sensor, etc.) for acquiring information related to travelling of the vehicle 10.

The user interface device 120 may include a display 121 that displays various types of information related to travelling and/or functions of the vehicle 10, and an inputter 122 that receives a user input.

The inputter 122 may receive various user inputs for setting functions of the vehicle 10 from the user. For example, the inputter 122 may be provided as a tact switch, a joystick, a push switch, a slide switch, a toggle switch, a micro switch, or a touch screen.

The display 121 may provide a user interface for interaction between the user and the vehicle 10. For example, the display 121 may include a liquid crystal display (LCD) panel and/or a light emitting diode (LED).

The autonomous driving device 130 may include a plurality of electronic components for allowing the vehicle 10 to autonomously travel based on the surrounding environment information of the vehicle 10 received through the sensor 110.

For example, the autonomous driving device 130 may include a driver assistance system (DAS) for controlling an engine management system (EMS), a transmission control unit (TCU), an electronic brake control module (EBCM, an electronic power steering (EPS), and a body control module (BCM).

The EMS may control the engine in response to a request from the DAS, the TCU may control the transmission in response to a request from the DAS, the EBCM may control braking of the vehicle 10 in response to a request from the DAS, the EPS may control steering of the vehicle 10 in response to a request from the DAS, and the BCM may control electronic components (a direction indicator lamp, a head lamp, etc.) providing convenience to the driver or ensure driver safety, in response to a request of the DAS.

The autonomous driving device 130 may control the behavior of the vehicle 10 so that the vehicle 10 travels according to the travelling route calculated by the controller 150.

In an embodiment, the autonomous driving device 130 may, upon an obstacle being detected on the travelling route of the vehicle 10, prevent the vehicle 10 from colliding with the obstacle by temporary stopping the vehicle, or avoid collision with the obstacle through steering.

In addition, the DAS may further include a surround view monitor (SVM) system and/or a parking assistance system (PAS).

The communicator 140 may include a long-range communication module and/or short-range communication module that exchanges data with an external device (e.g., a server or a user terminal).

For example, the communicator 140 may refer to a communication module, such as a wireless LAN (WLAN), Wireless Broadband (Wibro), Wi-Fi, World Interoperability for Microwave Access (Wimax), high speed downlink packet access (HSDPA), etc, for performing wireless Internet communication.

According to various embodiments, the communicator 140 may include a Bluetooth communication module and/or a UWB communication module for exchanging data with a server and/or a user terminal.

The user terminals may include all types of handheld-based wireless communication devices, such as smart phones, and wearable devices, such as watches, rings, bracelets, anklets, necklaces, glasses, contact lenses, or a head-mounted device (HMD).

For example, the communicator 140 may receive parking space information of a parking lot from a control server of the parking lot. The parking space information of the parking lot may include information about a currently available parking space and information about a currently occupied parking space.

In addition, the communicator 140 may receive a HD map of the parking lot from the control server of the parking lot and/or a cloud server.

The controller 150 according to an exemplary embodiment of the present disclosure may be a hardware device implemented by various electronic circuits (e.g., computer, microprocessor, CPU, ASIC, circuitry, logic circuits, etc.). The controller 150 may be implemented by at least one memory in which a program for performing the above-described operations and operations to be described below is stored, and at least one processor for executing the stored program, software instructions reproducing algorithms, etc. The at least one memory and the at least one processor may be implemented as separate semiconductor devices or as a single integrated semiconductor device.

The controller 150 may be electrically connected to the storage 100, the sensor 110, the user interface device 120, the autonomous driving device 130, and/or the communicator 140, to control the storage 100, the sensor 110, the user interface device 120, the autonomous driving device 130, and/or the communicator 140.

When the controller 150 includes a plurality of memories and a plurality of processors, the plurality of memories and the plurality of processors may be integrated into one chip or may be physically separated.

In addition, the controller 150 may include an image processor for processing the surrounding image of the vehicle 10 acquired from the sensor 110.

The controller 150 may perform image pre-processing on the surrounding image of the vehicle 10 acquired from the sensor 110. The image preprocessing process may include one or more processes of processing surrounding images of the vehicle 10 into a surround view image in the form of a bird's eye view.

The surround view image refers to an image having a view seen from the upper side of the vehicle 10 to the lower side of the vehicle 10. That is, the surround view image may include information about the front, rear, and side of the vehicle 10.

In addition, the controller 150 may calculate a travelling route that allows the vehicle 10 to be parked in a target parking space from a starting point on the HD map of the parking lot.

The storage 100, the sensor 110, the user interface device 120, the autonomous driving device 130, the communicator 140, and the controller 150 may communicate with each other through the vehicle communication network. For example, such components may exchange data through Ethernet, Media Oriented Systems Transport (MOST), Flexray, Controller Area Network (CAN), Local Interconnect Network (LIN), etc.

In FIG. 2, the storage 100, the sensor 110, the user interface device 120, the autonomous driving device 130, the communicator 140, and the controller 150 are illustrated as separate configurations, but may also be understood as a configuration divided by functions.

For example, the storage 100, the user interface device 120, the communicator 140, and/or the sensor 110 (e.g., a GPS sensor) may be a configuration of a navigation device of the vehicle 10.

In addition, the sensor 110, the controller 150, and the autonomous driving device 130 may be a configuration of the autonomous travelling system of the vehicle 10.

In the above, various components of the vehicle 10 have been described, but components may be added or omitted within the scope of conventional technology.

Figure 3:
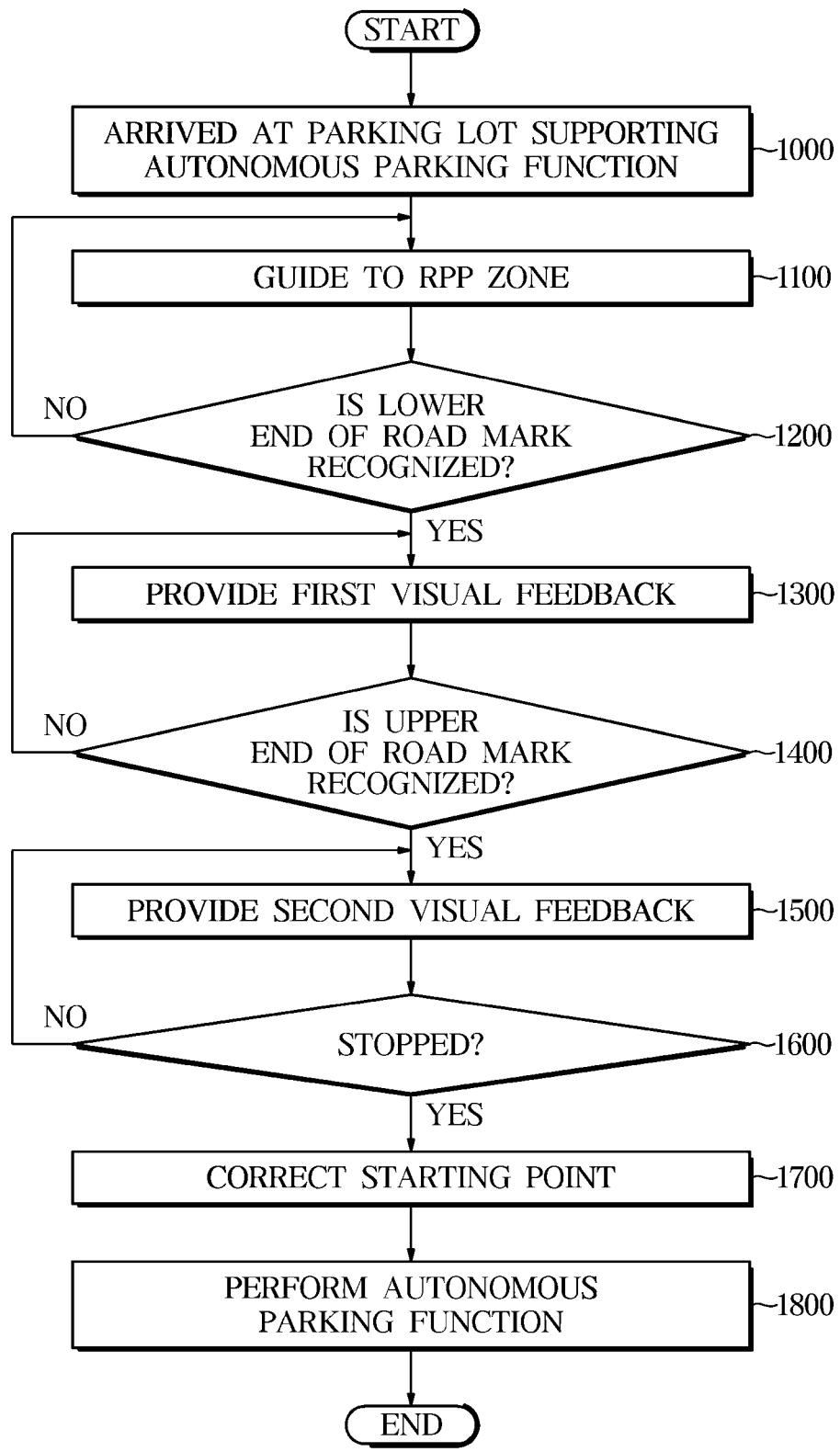
FIG. 3 is a flowchart showing a method of controlling a vehicle according to an embodiment.

FIG. 3 is a flowchart showing a method of controlling a vehicle according to an embodiment.

A user may set a destination through the user interface device 120 and receive a travelling route to the destination.

In an embodiment, in the storage 100, a HD map of a parking lot corresponding to the destination set through the user interface device 120 may be stored in advance.

In another embodiment, the controller 150 may control the communicator 140 to receive a HD map of a parking lot corresponding to a destination set through the user interface device 120 from an external server.

Specifically, the controller 150 may, based on a user input for setting a destination being received, control the communicator 140 to transmit a request signal for requesting a HD map of a parking lot corresponding to the destination to an external server.

The storage 100 may store the HD map of the parking lot received from the external server.

The controller 150 may, based on the HD map of the parking lot corresponding to the destination being stored in the storage 100, identify the parking lot as a parking lot supporting an autonomous parking function.

The controller 150 may, based on the vehicle 10 having arrived at the destination having the parking lot supporting the autonomous parking function (1000), automatically execute the autonomous parking function.

For example, the controller 150 may, based on the vehicle 10 having arrived at the parking lot supporting the autonomous parking function, control the user interface device 120 to provide a user interface for performing the autonomous parking function.

In one embodiment, the controller 150 may, based on the vehicle 10 having arrived at the parking lot supporting the autonomous parking function, control the display 121 to provide visual feedback for guiding the vehicle 10 to an RPP zone (1100).

Figure 4:
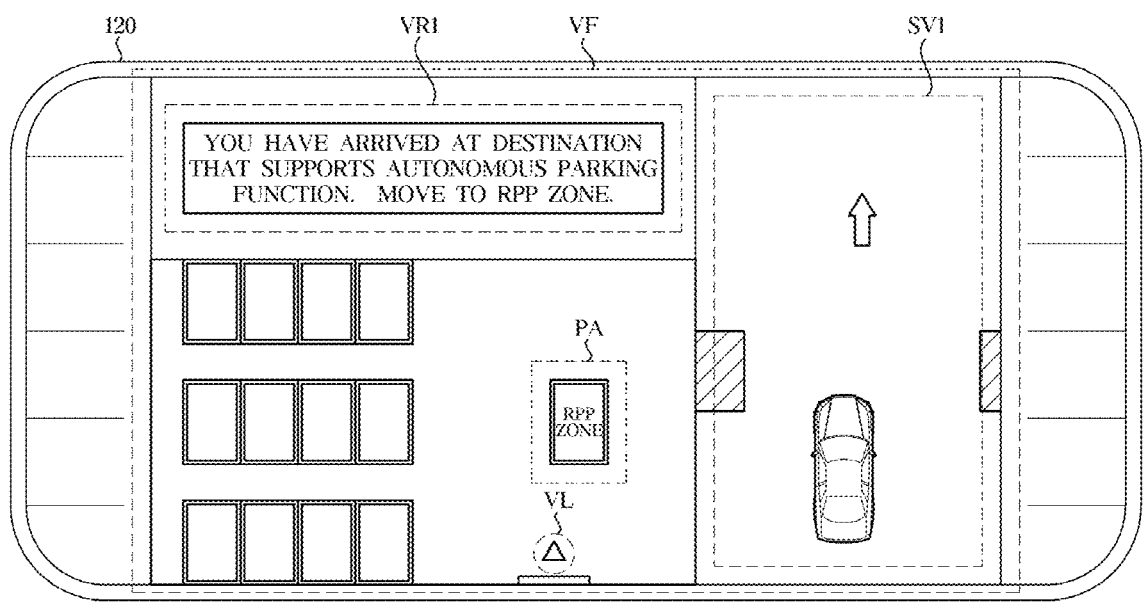
FIG. 4 illustrates an example of visual feedback provided to a driver when a vehicle arrives at a parking lot supporting an autonomous parking function, according to an embodiment.
Figure 5:
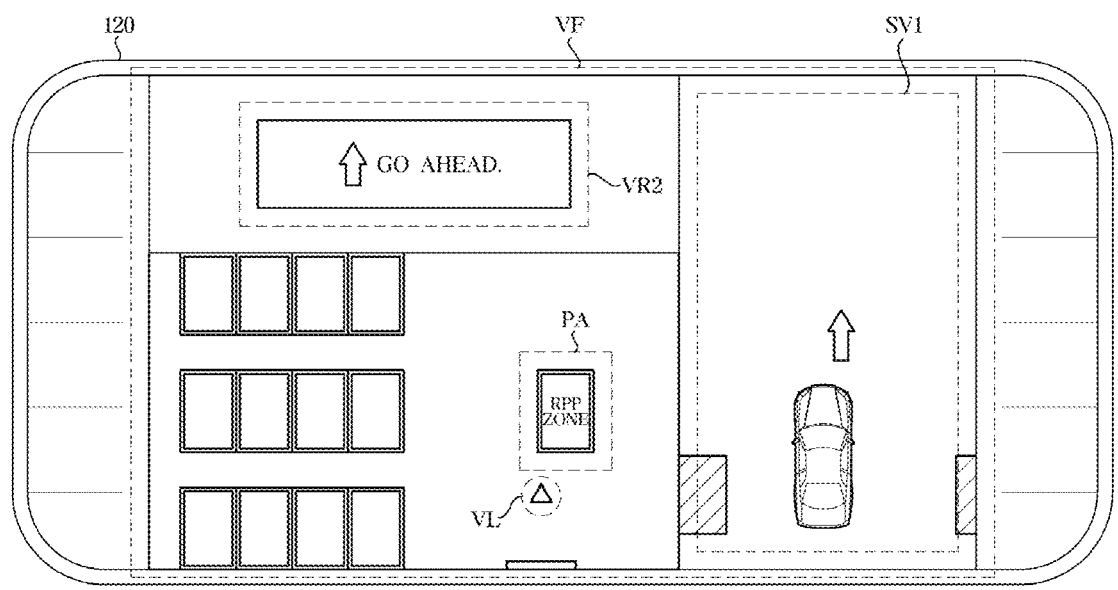
FIG. 5 illustrates an example of visual feedback provided to a driver to guide a vehicle to an RPP zone according to an embodiment.

FIG. 4 illustrates an example of visual feedback provided to a driver when a vehicle arrives at a parking lot supporting an autonomous parking function, according to an embodiment, and FIG. 5 illustrates an example of visual feedback provided to a driver to guide a vehicle to an RPP zone according to an embodiment.

Referring to FIG. 4, visual feedback VF for guiding the vehicle 10 to the RPP zone may include a visual representation VR1 for guiding the vehicle 10 to the RPP zone and/or a surround view image SV1.

In the present disclosure, a visual representation may refer to any form of devices for visually delivering information to a user. For example, the visual representation may include text, images, animations, figures, and/or combinations thereof.

In one embodiment, the visual representation VR1 for guiding the vehicle 10 to the RPP zone may include a visual representation indicating that the vehicle 10 has arrived at a parking lot supporting an autonomous parking function and/or a visual representation for moving the vehicle 10 to the RPP zone.

For example, the display 121 may output text "You have arrived at the destination supporting the autonomous parking function. Go to the RPP ZONE", and output a map indicating the location of the vehicle 10 in the parking lot.

To this end, the controller 150 may identify the location of the vehicle 10 in the parking lot based on the HD map of the parking lot and the information acquired from the sensor 110, and generate a map indicating the location of the vehicle 10 in the parking lot.

The map indicating the location of the vehicle 10 in the parking lot may include location information VL of the vehicle 10 and location information of the RPP zone in the parking lot.

The driver may allow the vehicle 10 to travel to the RPP zone based on the map displayed on the display 121.

In an embodiment, the surround view image SV1 may be a surround view image with a reduced magnification. In this case, the surround view image SV1 with a reduced magnification may refer to a surround view image reduced with a magnification (0.5) from a surround view image with a basic magnification (1×)

To this end, the controller 150 may, based on the vehicle 10 having arrived at the parking lot, control the display 121 to display the surround view image SV1 with a reduced-magnification.

The surround view image SV1 with a reduced magnification may have a wide field of view while the vehicle 10 appears small. Accordingly, when the surround view image SV1 with a reduced magnification is displayed, the driver may more quickly recognize the location of the RPP zone.

In FIG. 4, an example of visual feedback provided to the user immediately after the vehicle 10 arrives at the parking lot is shown, and in FIG. 5, an example of visual feedback provided to the user when a preset time elapses after the vehicle 10 arrives at the parking lot or after the vehicle 10 enters the parking lot is shown.

Referring to FIG. 5, the visual feedback VF for guiding the vehicle 10 to the RPP zone may be changed according to the location of the vehicle 10 in the parking lot.

For example, the visual feedback VF for guiding the vehicle 10 to the RPP zone may include turn-by-turn (TBT) information VR2 for guiding the vehicle 10 to the RPP zone.

In one embodiment, the controller 150 may provide the visual feedback VF for guiding the vehicle 10 to the RPP zone until a road mark PA defining the RPP zone is recognized from the surround view image (e.g., a reduced magnification surround view image or a basic magnification surround view image) (NO in operation 1200).

According to the present disclosure, when the vehicle arrives at a parking lot that supports an autonomous parking function, the autonomous parking function of the vehicle may be automatically executed, thereby facilitating the driver utilizing the autonomous parking function.

In addition, according to the present disclosure, the vehicle may be provided with visual feedback for guiding the vehicle to the RPP zone for performing an autonomous parking function, so that the driver may easily use the autonomous parking function.

According to various embodiments, the controller 150 may detect a road environment around the vehicle 10 based on the reduced magnification surround view image SV1 and/or the basic magnified surround view image being processed.

For example, the controller 150 may, when a reduced-magnification surround view image SV1 is displayed on the display 121, detect the road environment around the vehicle 10 based on the reduced-magnification surround view image SV1 being processed.

However, the controller 150 may, regardless of whether a reduced magnification surround view image SV1 is output to the display 121, detect the road environment around the vehicle 10 based on the basic magnification surround view being processed.

The controller 150 may recognize the road mark PA defining the RPP zone in the reduced magnification surround view image SV1 or the basic magnification surround view image.

As a method of recognizing the road mark PA from the surround view image, various well-known methods may be used.

For example, the controller 150 may use a Haar-based cascade AdaBoost classifier, a neural network classifier, or a support vector machine, etc. to acquire a road mark PA in the surround view image. However, the scope of the embodiment is not limited thereto, and the controller 150 may detect the road mark PA from the surround view image using various road mark detection techniques.

According to various embodiments, the road mark PA defining the RPP zone may be different from a mark defining a general parking zone. For example, the color of the road mark PA defining the RPP zone may be different from the color of the mark defining the general parking zone.

The controller 150 may check information about the road mark PA defining the RPP zone from the HD map of the parking lot stored in the storage 100, and recognize the road mark PA based on the information about the road mark PA defining the RPP zone.

For example, upon receiving information that the color of the road mark PA is orange, the controller 150 may identify the road mark PA in a color of orange as a road mark PA defining an RPP zone.

The controller 150 may, based on the lower end PAB of the road mark PA being recognized from the surround view image (e.g., a surround view image with a basic magnification or a surround view image with a reduced magnification) (YES in operation 1200), control the display 121 to provide first visual feedback VF1 (1300).

For example, the controller 150 may, based on two vertices of the road mark PA being recognized in the surround view image and at least one side perpendicular to a side connecting the two vertices being detected in the surround view image, recognize the side connecting the two vertices as a lower end PAB of the road mark PA.

As another example, the controller 150 may, based on two vertices of the road mark PA being recognized in the surround view image and at least one side extending in a direction coinciding with the travelling direction of the vehicle 10 being detected in the surround view image, recognize a side connecting the two vertices as a lower end PAB of the road mark PA.

Figure 6:
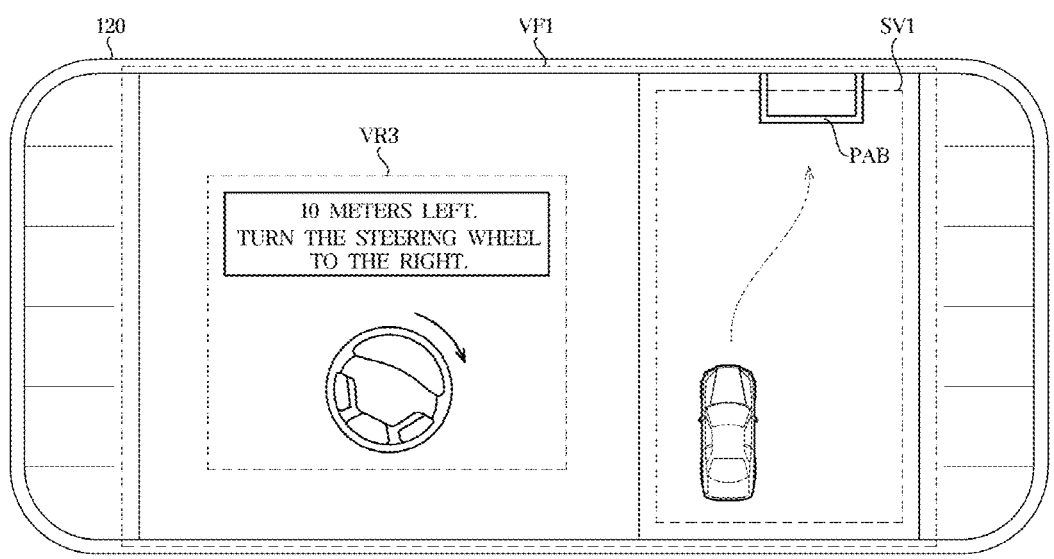
FIG. 6 illustrates an example of visual feedback provided to a driver when a vehicle recognizes a lower end of a road mark defining an RPP zone, according to an embodiment.

FIG. 6 illustrates an example of visual feedback provided to a driver when a vehicle recognizes a lower end of a road mark defining an RPP zone, according to an embodiment.

Referring to FIG. 6, first visual feedback VF1 may include a visual representation VR3 for guiding the vehicle 10 to the RPP zone based on a positional relationship between the vehicle 10 and the lower end PAB of the road mark PA and/or a surround view image SV1.

The controller 150 may, when the lower end PAB of the road mark PA is recognized in the surround view image, control the display 121 to display the visual representation VR3 for guiding the vehicle 1 to the RPP zone based on the positional relationship between the vehicle 10 and the lower end PAB of the road mark PA.

In one embodiment, the visual representation VR3 guiding the vehicle 10 to the RPP zone may include a first visual representation indicating a distance between the rear side of the vehicle 10 and the lower end PAB of the road mark PA, and/or a second visual representation indicating a required acceleration corresponding to the distance between the rear side of the vehicle 10 and the lower end PAB of the road mark PA and a speed of the vehicle 10, and/or a third visual representation indicating a required steering direction for matching a center of the vehicle 10 and a center of the lower end PAB of the road mark PA.

To this end, the controller 150 may calculate the positional relationship between the vehicle 10 and the lower end PAB of the road mark PA, and may control the display 121 to display visual representation corresponding to the positional relationship between the vehicle 10 and the lower end PAB of the road mark PA.

For example, when the distance between the rear side of the vehicle 10 and the lower end PAB of the road mark PA is determined to be 10 m, and the center of the vehicle 10 is deviated leftward from the center of the lower end PAB of the road mark PA, the display 121 may output text "10 m left. Turn the steering wheel to the right." and output an image of a steering wheel and an arrow-shaped image indicating a required steering direction.

However, the first visual representation indicating the distance between the rear side of the vehicle 10 and the lower end PAB of the road mark PA is not limited to text, and may include an image in the form of a vertical/horizontal gauge bar.

In addition, the controller 150 may control the display 121 to output a visual representation corresponding to the distance between the rear side of the vehicle 10 and the lower end PAB of the road mark PA and the speed of the vehicle 10.

For example, when the distance between the rear side of the vehicle 10 and the lower end PAB of the road mark PA is 10 m and the speed of the vehicle 10 is 10 m/s, the display 121 may output "Decelerate".

That is, the controller 150 may, upon identifying that the speed of the vehicle 10 is fast compared to the distance between the rear side of the vehicle 10 and the lower end PAB of the road mark PA, control the display 121 to display a visual representation for requesting deceleration of the vehicle 10, and upon identifying that the speed of the vehicle 10 is slow compared to the distance between the rear side of the vehicle 10 and the lower end PAB of the road mark PA, control the display 121 to display a visual representation for requesting acceleration of the vehicle 10.

As an example, the controller 150 may, based on identifying that the time required to travel the distance between the rear side of the vehicle 10 and the lower end PAB of the road mark PA at the current speed of the vehicle 10 is shorter than or equal to a preset time (e.g.: about 2 seconds), control the display 121 to display a visual representation requesting deceleration, and based on identifying that the time required to travel the distance between the rear side of the vehicle 10 and the lower end PAB of the road mark PA at the current speed of the vehicle 10 is longer than or equal to a preset time (e.g.: about 4 seconds), control the display 121 to display a visual representation requesting acceleration.

According to various embodiments, the controller 150 may determine the center point of the lower end PAB of the road mark PA detected from the surround view image, and calculate the positional relationship between the vehicle 10 and the road mark PA based on the center point of the lower end PAB of the road mark PA, and calculate a travelling trajectory of the vehicle 10 according to the positional relationship.

In this case, the controller 150 may calculate the travelling trajectory of the vehicle 10 based on the speed of the vehicle 10.

In addition, the controller 150 may calculate the distance between the lower end PAB of the road mark PA and the rear side of the vehicle 10.

As described above, the surround view image SV1 displayed on the display 121 may be a surround view image with a reduced magnification.

The controller 150 may provide the first visual feedback VF1 until the upper end PAT of the road mark PA is detected from the surround view image (e.g., a reduced magnification surround view image or a basic magnified surround image) (NO in operation 1400).

According to the present disclosure, a vehicle having become adjacent to the RPP zone may be provided with more detailed travelling instructions using the lower end of the road mark, thereby assisting the driver in easily stopping the vehicle within the road mark.

As described above, the controller 150 may continuously detect the road environment around the vehicle 10 based on the surround view image (a surround view image with a reduced magnification or a surround view image with a basic magnification) being processed.

The controller 150 may, based on the upper end PAT of the road mark PA being recognized from the surround view image (YES in 1400), control the display 121 to provide the second visual feedback VF2 (1500).

For example, the controller 150 may, based on two vertices of the road mark PA being recognized and at least one side perpendicular to a side connecting the two vertices being detected in the surround view image except for the lower end PAB of the road mark PA, recognize the side connecting the two vertices as an upper end PAT of the road mark PA.

As another example, the controller 150 may, based on two vertices of the road mark PA being recognized in the surround view image and at least one side extending in a direction opposite to the travelling direction of the vehicle 10 being detected in the surround view image, recognize a side connecting the two vertices as a upper end PAT of the road mark PA.

Figure 7:
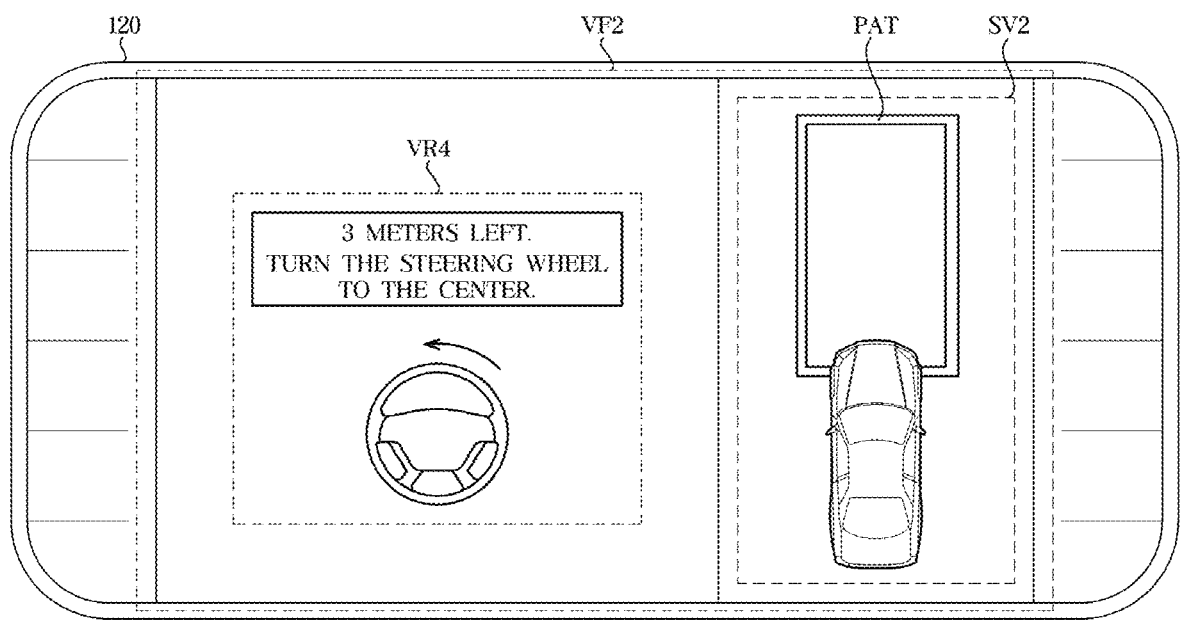
FIG. 7 illustrates an example of visual feedback provided to a driver when a vehicle recognizes an upper end of a road mark defining an RPP zone according to an embodiment.
Figure 8:
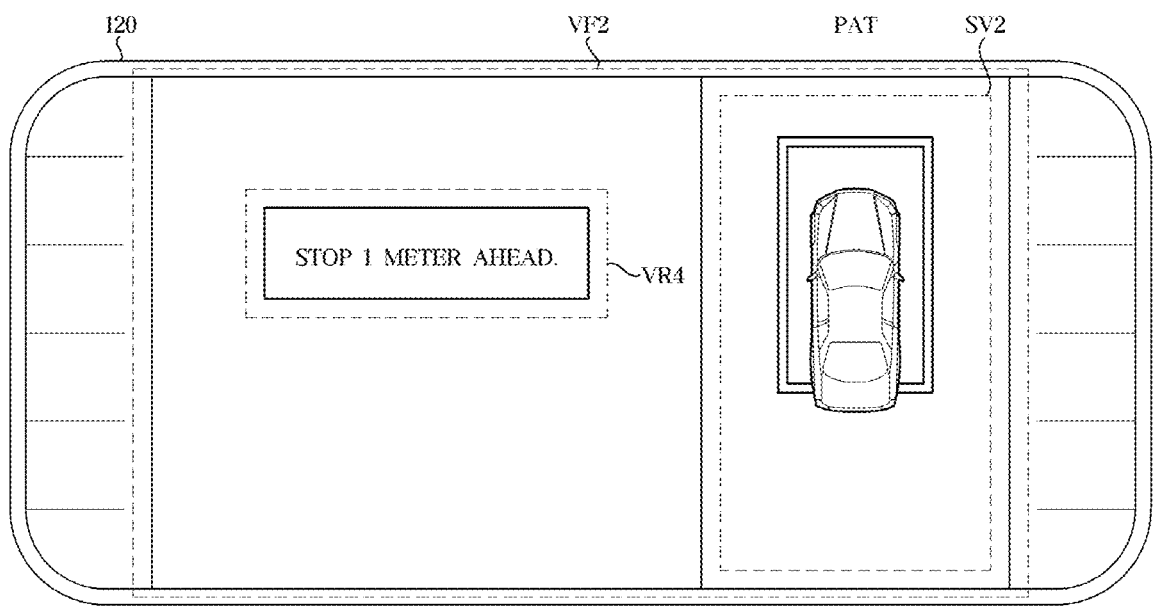
FIG. 8 illustrates an example of visual feedback provided to a driver when a vehicle recognizes an upper end of a road mark defining an RPP zone according to an embodiment.

FIG. 7 illustrates an example of visual feedback provided to a driver when a vehicle recognizes an upper end of a road mark defining an RPP zone according to an embodiment, and FIG. 8 illustrates an example of visual feedback provided to a driver when a vehicle recognizes an upper end of a road mark defining an RPP zone according to an embodiment.

Referring to FIGS. 7 and 8, second visual feedback VF2 may include a visual representation VR4 for guiding the vehicle 10 into the RPP zone based on a positional relationship between the vehicle 10 and the upper end PAT of the road mark PA and/or a surround view image SV2.

The controller 150 may, when the upper end PAT of the road mark PA is recognized in the surround view image, control the display 121 to display the visual representation VR4 for guiding the vehicle 1 into the RPP zone based on the positional relationship between the vehicle 10 and the upper end PAT of the road mark PA.

In one embodiment, the visual representation VR4 guiding the vehicle 10 to the RPP zone may include a fourth visual representation indicating a distance between the front side of the vehicle 10 and the upper end PAT of the road mark PA, and/or a fifth visual representation indicating a required acceleration corresponding to the distance between the front side of the vehicle 10 and the upper end PAT of the road mark PA and a speed of the vehicle 10, and/or a sixth visual representation indicating a required steering direction for matching a center of the vehicle 10 and a center of the upper end PAT of the road mark PA.

To this end, the controller 150 may calculate the positional relationship between the vehicle 10 and the upper end PAT of the road mark PA, and may control the display 121 to display visual representation corresponding to the positional relationship between the vehicle 10 and the upper end PAT of the road mark PA.

For example, when the distance between the front side of the vehicle 10 and the upper end PAT of the road mark PA is determined to be 3 m, and the center of the vehicle 10 matches the center of the upper end PAT of the road mark PA, the display 121 may output text "3 m left. Turn the steering wheel to the center.", and output an image of a steering wheel and an arrow-shaped image indicating a required steering direction.

However, the fourth visual representation indicating the distance between the front side of the vehicle 10 and the upper end PAT of the road mark PA is not limited to text, and may include an image in the form of a vertical/horizontal gauge bar.

In addition, the controller 150 may control the display 121 to output a visual representation corresponding to the distance between the front side of the vehicle 10 and the upper end PAT of the road mark PA and the speed of the vehicle 10.

For example, when the distance between the front side of the vehicle 10 and the upper end PAT of the road mark PA is 3 m and the speed of the vehicle 10 is 3 m/s, the display 121 may output "Stop".

As another example, when the distance between the front side of the vehicle 10 and the upper end PAT of the road mark PA is 3 m and the speed of the vehicle 10 is 2 m/s, the display 121 may output "Decelerate".

That is, the controller 150 may, upon identifying that the speed of the vehicle 10 is fast compared to the distance between the front side of the vehicle 10 and the upper end PAT of the road mark PA, control the display 121 to display a visual representation for requesting stopping of the vehicle 10, and upon identifying that the speed of the vehicle 10 is slow compared to the distance between the front side of the vehicle 10 and the upper end PAT of the road mark PA, control the display 121 to display a visual representation for requesting deceleration of the vehicle 10.

As an example, the controller 150 may, based on identifying that the time required to travel the distance between the front side of the vehicle 10 and the upper end PAT of the road mark PA at the current speed of the vehicle 10 is shorter than or equal to a preset time (e.g.: about 1 second), control the display 121 to display a visual representation requesting stopping, and based on identifying that the time required to travel the distance between the front side of the vehicle 10 and the upper end PAT of the road mark PA at the current speed of the vehicle 10 is longer than or equal to a preset time (e.g.: about 1.5 seconds), control the display 121 to display a visual representation requesting deceleration.

In various embodiments, the controller 150 may, regardless of the speed of the vehicle 10, based on the distance between the front side of the vehicle 10 and the upper end PAT of the road mark PA being shorter than or equal to a preset distance (e.g., about 0.5 meters), control the display 121 to output a visual representation requesting a stop.

According to the present disclosure, a vehicle almost arriving at the RPP zone may be provided with more detailed travelling instructions using the upper end of the road mark, thereby assisting the driver in easily stopping the vehicle in the road mark. Further, according to the present disclosure, when the upper end of the road mark is recognized, a line serving as a reference for generating the travelling instruction is changed from the lower end of the road mark to the upper end of the road mark, thereby providing more accurate travelling instructions.

In an embodiment, the surround view image SV2 may be a surround view image with an enlarged magnification. In this case, the surround view image SV2 with an enlarged magnification may refer to a surround view image magnified with a preset magnification (×1.5) from a surround view image with a basic magnification (1×).

That is, the controller 150 may, based on the upper end PAT of the road mark PA being recognized in the surround view image (e.g., a reduced magnification surround view image or a basic magnification surround view image), control the display 121 to output the surround view image SV2 with an enlarged magnification.

The surround view image SV2 with an enlarged magnification has a narrow field of view while showing, in magnification, the vehicle 10. Accordingly, when the surround view image SV2 with an enlarged magnification is displayed, the driver may more easily park the vehicle 10 in the RPP zone.

According to the present disclosure, a surround view image with an enlarged magnification may be provided to a driver when almost arrived at the RPP zone, thereby assisting the driver in more accurately parking the vehicle in the RPP zone.

According to various embodiments, the controller 150 may, based on the upper end PAT of the road mark PA being recognized in the surround view image (YES in operation 1400), track the position of the upper end PAT of the road mark PA.

As a method of tracking the position of the upper end PAT of the road mark PA, various well-known methods may be utilized.

For example, the controller 150 may recognize the upper end PAT of the road mark PA as a first object from a point in time when the upper end PAT of the road mark PA is recognized in the surround view image, and continuously track the position of the first object.

The controller 150 may track a change in the position of the first object using a similarity of characteristic information, such as a size, color, shape, or outline, of the first object in image frames of the surround view image.

As another example, the controller 150 may generate dead reckoning information based on speed data acquired from the vehicle speed sensor and steering angle data acquired from the steering angle sensor being processed.

Accordingly, the controller 150 may calculate the positional relationship between the first object and the vehicle 10 at a time when the first object is recognized, and based on dead reckoning information generated after the first object is recognized, track changes in the position of the first object.

The controller 150 may provide the second visual feedback VF2 until the road mark PA for defining the RPP zone is no longer recognized or the vehicle 10 is stopped (NO in operation 1600).

In one embodiment, the controller 150 may, based on the vehicle 10 being stopped in a state in which the road mark PA for defining the RPP zone is not recognized, determine that the driver does not intend to use the autonomous parking function.

Accordingly, when the vehicle 10 is stopped in a state in which the road mark PA for defining the RPP zone is not recognized, the controller 150 may not provide a user interface for performing the autonomous parking function.

Figure 9:
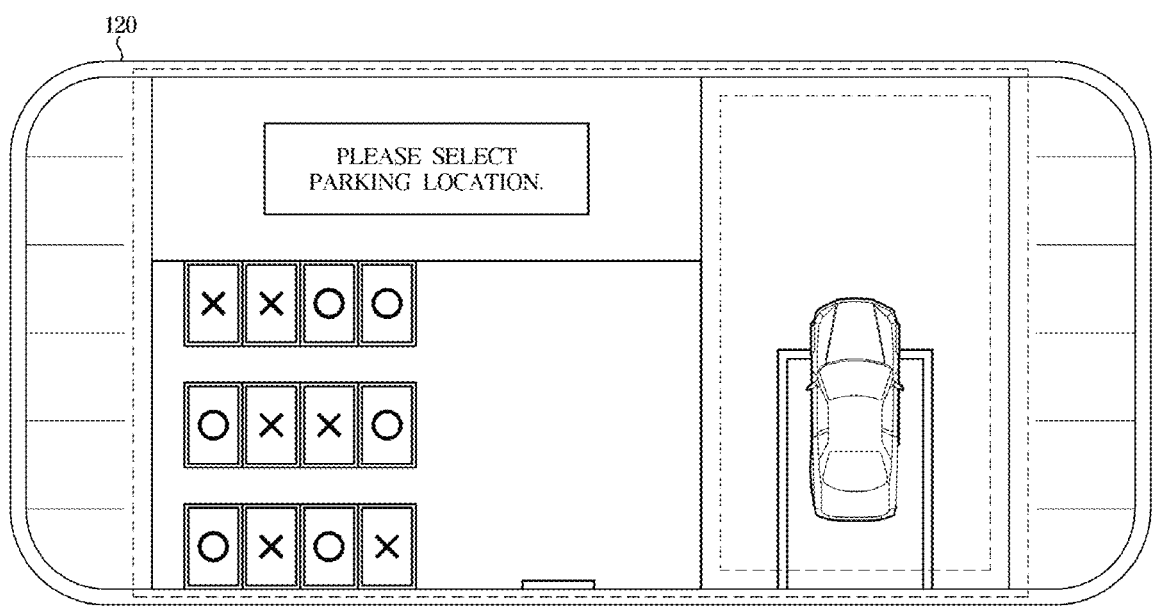
FIG. 9 illustrates an example of visual feedback provided to a driver when a vehicle is stopped in the vicinity of an RPP zone according to an embodiment.

FIG. 9 illustrates an example of visual feedback provided to a driver when a vehicle is stopped in the vicinity of an RPP zone according to an embodiment.

Referring to FIG. 9, the controller 150 may, based on the vehicle 10 being stopped in a state in which a part of the road mark PA for defining the RPP zone is recognized in the surround view image, provide a user interface for performing an autonomous parking function.

Specifically, the controller 150 may, based on the vehicle 10 being stopped in a state in which a part of the road mark PA for defining the RPP zone is recognized in the surround view image, control the display 121 to display a user interface for performing an autonomous parking function.

In addition, the controller 150 may, based on the vehicle 10 being stopped in a state in which a part of the road mark PA for defining the RPP zone is recognized in the surround view image, control the communicator 140 to transmit parking space information of the parking lot to an external server.

The communicator 140 may receive the parking space information of the parking lot from the external server, and may transmit the received parking space information to the controller 150.

As described above, the parking space information of the parking lot may include information about a currently available parking space and information about a currently occupied parking space among a plurality of parking spaces.

The controller 150 may control the display 121 to provide a user interface for receiving a user input for selecting a parking space based on the parking space information of the parking lot.

The driver may check a currently selectable parking space through the user interface displayed on the display 121, and may select a parking space in which the driver desires to park the vehicle 10 through the inputter 122.

For example, the driver may touch a selectable parking space to select the parking space.

However, according to various embodiments, the user interface described in FIG. 9 may be provided to the driver through a user terminal.

For example, the controller 150 may, based on the vehicle 10 being stopped in a state in which a part of the road mark PA for defining the RPP zone is recognized in the surround view image, control the display 121 to output a visual representation for inducing the driver to get off.

In addition, the controller 150 may control the communicator 140 to transmit a command for performing an autonomous parking function and parking space information to the user terminal associated with the vehicle 10.

Accordingly, the driver may be provided with the user interface described in FIG. 9 through the user terminal.

Figure 10:
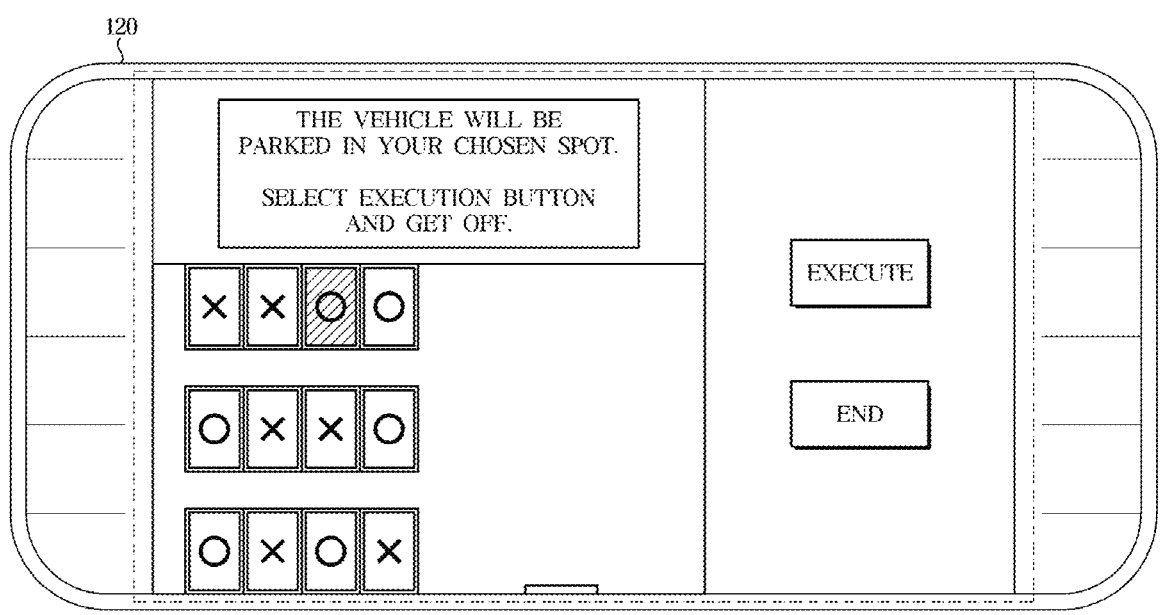
FIG. 10 illustrates an example of a user interface for performing an autonomous parking function.

FIG. 10 illustrates an example of a user interface for performing an autonomous parking function.

Referring to FIG. 10, the controller 150 may, based on the a target parking zone, in which the driver desires to park the vehicle, being determined, provide a user interface for executing an autonomous parking function.

The target parking zone in which the driver desires to park the vehicle, may be selected through the user interface described in FIG. 9 or may be selected through an automatic selection function as the nearest parking space.

The driver may select an execution button to input a command for executing the autonomous parking function.

For example, when the user interface shown in FIG. 9 is displayed on the display 121 of the vehicle 10, the driver may select an execution button and then get off the vehicle 10 to use the autonomous parking function.

As another example, when the user interface shown in FIG. 9 is displayed on the user terminal of the driver, the driver may get off the vehicle and then select an execution button through the user terminal to use the autonomous parking function. That is, the controller 150 may receive a user input for performing the autonomous parking function through the user interface device 120 or receive a user input for performing the autonomous parking function from the user terminal through the communicator 140.

Figure 11:
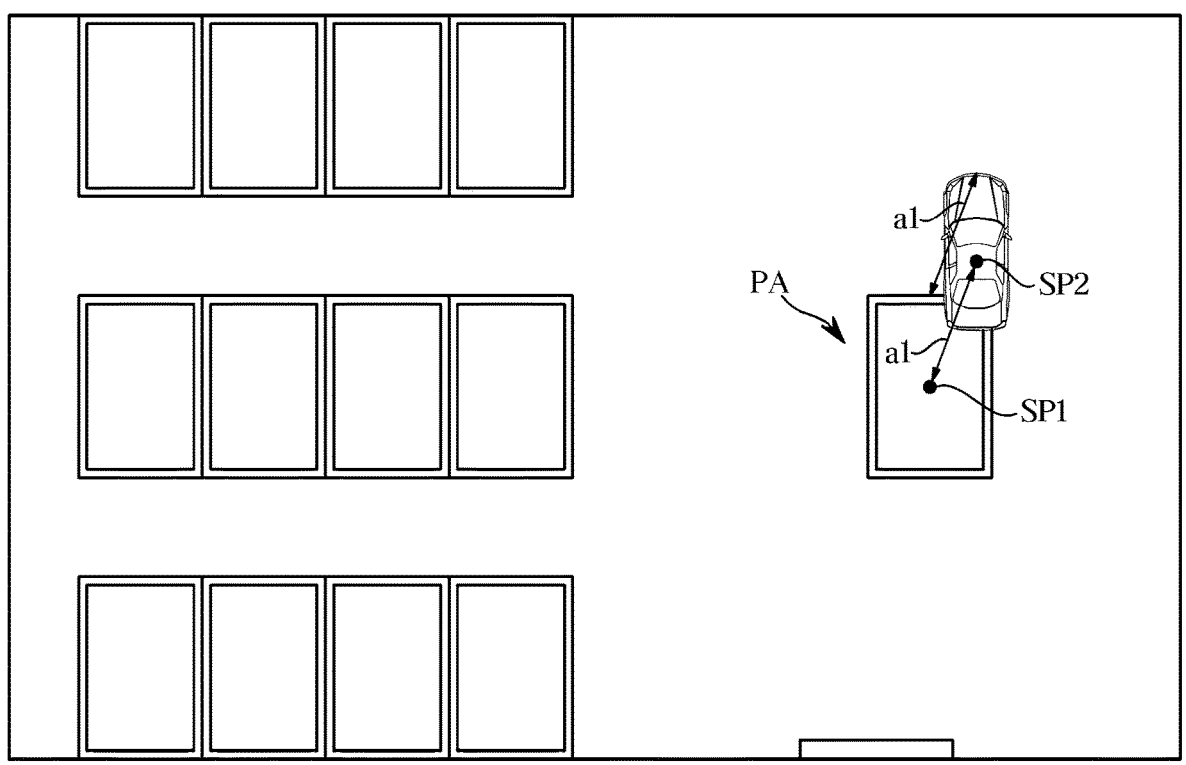
FIG. 11 illustrates a state in which a starting point on a HD map of a parking lot is corrected.

FIG. 11 illustrates a state in which a starting point on a HD map of a parking lot is corrected.

Referring to FIG. 11, the controller 150 may correct a starting point SP1 on the HD map of the parking lot to perform the autonomous parking function (1700).

As described above, in order to perform the autonomous parking function, a route between the preset starting point SP1 and the target parking zone may need to be calculated.

While the vehicle 10 is stopped in a position deviated from the RPP zone, the RPP zone on the HD map of the parking lot may be recognized as the starting point SP1 and the route to the target parking zone may be calculated based on the RPP zone, in which case, an unexpected accident may occur.

Accordingly, there is a need for the controller 150 to correct the starting point SP1 on the HD map to suit the current position of the vehicle 10.

In one embodiment, when the vehicle 10 is stopped, the controller 150 may correct the starting point SP1 on the HD map of the parking lot based on the position of the upper end PAT of the road mark PA.

Since the controller 150 is in a state of tracking the upper end PAT of the road mark PA from the point in time at which the upper end PAT of the road mark PA is recognized in the surround view image in operation 1400, the controller 150 may calculate the positional relationship between the vehicle 10 and the upper end PAT of the road mark PA.

For example, the controller 150 may generate a vector a1 between the center of the upper end PAT of the road mark PA and the center of the front side of the vehicle 10, and add the generated vector a1 to the center of the RPP zone so that the starting point SP1 on the HD map of the parking lot may be corrected.

That is, the position difference between the starting point SP2 after the correction and the starting point SP1 before the correction may be defined by the generated vector a1.

The controller 150 may perform an autonomous parking function based on the corrected starting point SP2 on the HD map of the parking lot (1800).

For example, the controller 150 may calculate a movement route from the corrected starting point SP2 to the target parking zone, and operate the autonomous driving device 130 to follow the movement route.

In addition, the controller 150 may calculate the heading angle of the vehicle 10 based on the direction of the upper end PAT of the road mark PA. For example, the controller 150 may calculate the heading angle of the vehicle 10 based on the angle between the upper end PAT of the road mark PA and the vehicle 10 at the position in which the vehicle 10 is stopped.

Accordingly, the controller 150 may calculate a movement route to the target parking zone based on the corrected starting point SP2 and the heading angle of the vehicle 10, and then operate the autonomous driving device 130 to follow the movement route.

According to the present disclosure, when a HD map of the parking lot is built, the autonomous parking function may be supported without expensive infrastructure of the parking lot.

Further, according to the present disclosure, the starting point on the HD map of the parking lot may be automatically corrected, so that the driver may not need to accurately stop the vehicle in the RPP zone Some of the components of the vehicle 10 may refer to a software component and/or a hardware component, such as a Field Programmable Gate Array (FPGA) and an Application Specific Integrated Circuit (ASIC).

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, according to the present disclosure, an autonomous parking function can be implemented through an autonomous driving device provided in a vehicle without an expensive parking lot infrastructure facility.

According to the present disclosure, the driver can intuitively identify whether a parking lot in which to park the vehicle is a parking lot allowing an autonomous parking travelling function.

According to the present disclosure, the driver can easily move the vehicle to an autonomous parking preparation zone (Remote Parking Pilot Zone: RPP zone) of a parking lot according to guidance provided by the vehicle.

According to the present disclosure, the driver can use an autonomous parking function even when the vehicle is not accurately parked within an RPP zone.

Although embodiments of the present disclosure have been described for illustrative purposes, those skilled in the art will appreciate that various modifications, additions and substitutions are possible, without departing from the scope and spirit of the disclosure. Therefore, embodiments of the present disclosure have not been described for limiting purposes.

What is claimed is:

1. A vehicle comprising:
   at least one camera configured to acquire a surrounding image of a vehicle;
   a display;
   a storage configured to store a high definition map (HD map) of a parking lot including an autonomous parking preparation zone; and
   at least one processor configured to,
   generate a surround view image based on processing the surrounding image of the vehicle, based on an upper end of a road mark defining the autonomous parking preparation zone being recognized in the surround view image,
   track a position of the upper end of the road mark,
   upon the vehicle being stopped while a part of the road mark is being recognized, correct a starting point on the HD map of the parking lot based on the position of the upper end of the road mark, and
   in response to a user input for performing an autonomous parking function being received, perform the autonomous parking function based on the correct starting point.

2. The vehicle of claim 1, wherein the at least one processor is configured to calculate a positional relationship between the vehicle and the autonomous parking preparation zone based on the position of the upper end of the road mark, and correct the starting point on the HD map of the parking lot based on the calculated positional relationship.

3. The vehicle of claim 1, wherein the at least one processor is configured to, based on the vehicle having arrived at the parking lot,
   control the display to output a visual representation for guiding the vehicle to the autonomous parking preparation zone.

4. The vehicle of claim 1, wherein the at least one processor is configured to, based on the vehicle having arrived at the parking lot, control the display to display a surround view image with a reduced magnification.

5. The vehicle of claim 1, wherein the at least one processor is configured to, in response to a lower end of the road mark being recognized in the surround view image, control the display to output a visual representation for guiding the vehicle into the autonomous parking preparation zone based on a positional relationship between the vehicle and the lower end of the road mark.

6. The vehicle of claim 5, wherein the visual representation for guiding the vehicle into the autonomous parking preparation zone includes one of:
   a first visual representation indicating a distance between a rear side of the vehicle and the lower end of the road mark, a second visual representation indicating a required acceleration corresponding to the distance and a speed of the vehicle, a third visual representation indicating a required steering direction for matching a center of the vehicle and a center of the lower end of the road mark, and a combination thereof.

7. The vehicle of claim 1, wherein the at least one processor is configured to based on the upper end of the road mark being recognized in the surround view image, control the display to display the surround view image with an enlarged magnification.

8. The vehicle of claim 1, wherein the at least one processor is configured to, in response to the upper end of the road mark being recognized in the surround view image, control the display to output a visual representation for guiding the vehicle into the autonomous parking preparation zone based on a positional relationship between the vehicle and the upper end of the road mark.

9. The vehicle of claim 8, wherein the visual representation for guiding the vehicle into the autonomous parking preparation zone includes one of:
   a first visual representation indicating a distance between a front side of the vehicle and the upper end of the road mark, a second visual representation indicating a required acceleration corresponding to the distance and a speed of the vehicle, a third visual representation indicating a required steering direction for matching a center of the vehicle and a center of the upper end of the road mark, and a combination thereof.

10. The vehicle of claim 1, further comprising a communicator configured to receive parking space information of the parking lot from a server.

11. A method of controlling a vehicle in which a HD map of a parking lot including an autonomous parking preparation zone is stored, the method comprising;
    generating a surround view image based on processing a surrounding image of the vehicle;
    based on an upper end of a road mark defining the autonomous parking preparation zone being recognized in the surround view image, tracking a position of the upper end of the road mark;
    upon the vehicle being stopped while a part of the road mark is being recognized, correcting a starting point on the HD map of the parking lot based on the position of the upper end of the road mark; and
    in response to a user input for performing an autonomous parking function being received, performing the autonomous parking function.

12. The method of claim 11, wherein the correcting of the starting point on the HD map of the parking lot includes
    calculating a positional relationship between the vehicle and the autonomous parking preparation zone based on the position of the upper end of the road mark, and correcting the starting point on the HD map of the parking lot based on the calculated positional relationship.

13. The method of claim 11, further comprising,
    based on the vehicle having arrived at the parking lot, outputting a visual representation for guiding the vehicle to the autonomous parking preparation zone.

14. The method of claim 11, further comprising, based on the vehicle having arrived at the parking lot, displaying a surround view image with a reduced magnification.

15. The method of claim 11, further comprising
    in response to a lower end of the road mark being recognized in the surround view image, outputting a visual representation for guiding the vehicle into the autonomous parking preparation zone based on a positional relationship between the vehicle and the lower end of the road mark.

16. The method of claim 15, wherein the visual representation for guiding the vehicle into the autonomous parking preparation zone includes one of:

a first visual representation indicating a distance between a rear side of the vehicle and the lower end of the road mark, a second visual representation indicating a required acceleration corresponding to the distance and a speed of the vehicle, a third visual representation indicating a required steering direction for matching a center of the vehicle and a center of the lower end of the road mark, and a combination thereof.

17. The method of claim 11, further comprising
based on the upper end of the road mark being recognized in the surround view image, displaying the surround view image with an enlarged magnification.

18. The method of claim 11, further comprising
in response to the upper end of the road mark being recognized in the surround view image, outputting a visual representation for guiding the vehicle into the autonomous parking preparation zone based on a positional relationship between the vehicle and the upper end of the road mark.

19. The method of claim 18, wherein the visual representation for guiding the vehicle into the autonomous parking preparation zone includes one of:

a first visual representation indicating a distance between a front side of the vehicle and the upper end of the road mark, a second visual representation indicating a required acceleration corresponding to the distance and a speed of the vehicle, a third visual representation indicating a required steering direction for matching a center of the vehicle and a center of the upper end of the road mark, and a combination thereof.

20. The method of claim 11, further comprising receiving parking space information of the parking lot from a server.

* * * * *